United States Patent [19]

Aleckson

[11] Patent Number: 4,837,964
[45] Date of Patent: Jun. 13, 1989

[54] FISH HARNESS

[76] Inventor: Darrell Aleckson, Rural Rte. #2 Box 917, Soldotna, Ak. 99669

[21] Appl. No.: 170,809

[22] Filed: Mar. 21, 1988

[51] Int. Cl.⁴ ............................ A01K 83/06; A01K 97/14
[52] U.S. Cl. ............................................ 43/4; 43/44.2; 224/103
[58] Field of Search ................ 224/103; 294/82.11, 294/82.44; 43/4, 5, 44.2, 44.4

[56] References Cited

U.S. PATENT DOCUMENTS

| | | | |
|---|---|---|---|
| 1,255,067 | 1/1918 | Thatcher | 43/44.4 |
| 2,143,054 | 1/1939 | Copeland | 43/44.4 |
| 2,210,271 | 8/1940 | Thwaits | 43/5 |
| 2,427,715 | 9/1947 | Cooper | 224/103 |
| 2,867,026 | 1/1959 | Gale | 294/82.14 |
| 3,197,912 | 8/1965 | Kramer | 43/44.4 |
| 4,090,651 | 5/1978 | Raquel | 224/103 |
| 4,229,901 | 10/1980 | Flowers et al. | 43/44.4 |
| 4,307,532 | 12/1981 | Hughs | 43/44.4 |

Primary Examiner—Kurt Rowan
Attorney, Agent, or Firm—Keith S. Bergman

[57] ABSTRACT

An elongate flexible cable defines an adjustable loop in one end and slidably carries a hook thereon for releasable positioning to provide a harness for a fish to fasten a fish's head to its tail to prevent flopping and thrashing. A fixed loop in one cable end has the cable passed through it to form the slidable loop to attach to a fish's tail. The slidably mounted hook is connected to the cable by a hole defined in an "L" shaped bracket to provide adjustably releasable positioning that is maintained by tensive forces on the bracket that cause canting.

3 Claims, 1 Drawing Sheet

U.S. Patent
Jun. 13, 1989
4,837,964
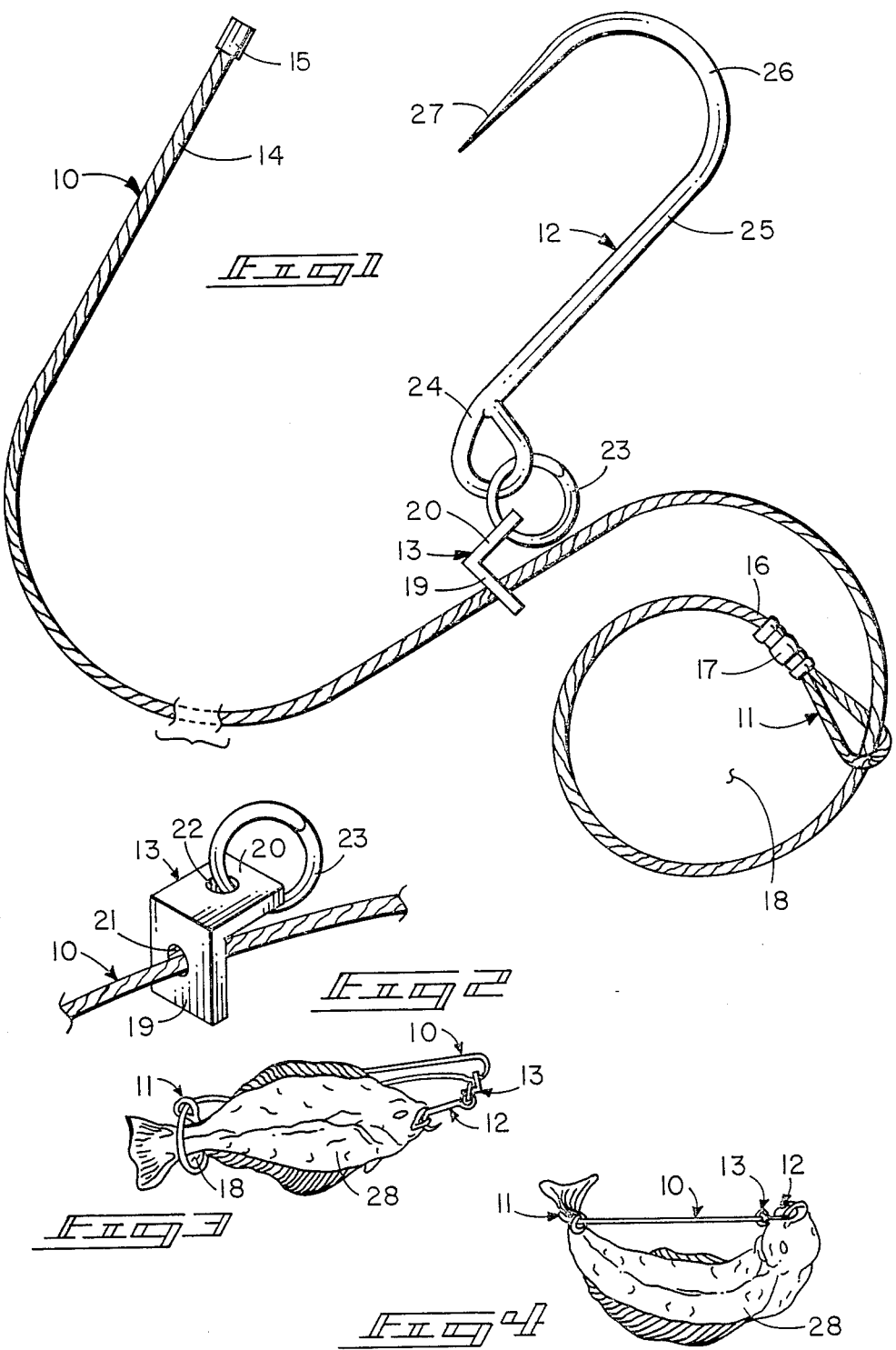

FISH HARNESS

BACKGROUND OF INVENTION

Related Applications

There are no applications related hereto heretofore filed in this or any foreign country.

FIELD OF INVENTION

My invention relates generally to a fish harness that releasably fastens a fish's mouth to its tail to prevent flopping.

BACKGROUND AND DESCRIPTION OF PRIOR ART

In the fishing arts generally, and especially in sport fishing, dealing with larger fish between the time of their catch and their expiration oftentimes presents a problem. In the case of a fisherman in a small boat, the problem is exacerbated and oftentimes can become a serious one.

Fish, when removed from their aquatic environs, commonly move their body in an erratic flopping motion, most probably by reason of an instinctual behavioral characteristic which probably exists to provide a potential means to return the fish to its aquatic environment. Since fish are generally well muscled, this flopping activity can potentially cause the loss of a fish that has been caught or in some environments, such as the limited space of a small boat, may cause injury to a fisherman or damage to the boat or its contents. Such activity also tends to bruise the muscle tissue of the fish to make it less desirable for eating by humans and to accelerate deterioration of the flesh, especially as caused by oxidation and microbal agents.

This problem has heretofore been recognized, but it seems that it has not been dealt with either too generally or too effectively.

When fish are caught either commercially or in sporting endeavors, it oftentimes is difficult to move them from their aquatic environment into the atmosphere and thence onto some supporting structure such as a boat. In this process, the fish is instinctively non-cooperative, his effective density substantially increases in the transfer from a more dense water media to a less dense gaseous media, and commonly control over the fish is not too substantial. Responsively to these problems various devices have come into existence to aid the process of secondary fish capture. Most of such devices provide some means of gaining more positive control over the fish, such as by a hooking device epitomized by the common gaff, a net of one sort or another, or an adjustable loop in a flexible line, commonly called a "tailer", which may be engaged about the fish's anatomy, commonly at the juncture of its tail and body. Many and various devices of all of these types have heretofore come to be known and commonly used in both sport and commercial fishery. These devices might generically be characterized as secondary catching devices for want of any other generic term.

Secondary catching devices have heretofore been used to a degree for containment or control of larger fish after the primary catching operation. In general, the devices have not been designed particularly for this purpose and are not either commonly or effectively used for it. Because of their lack of any specialized design, they commonly are not particularly efficient for the purpose. Secondly, in the fishing operation, such structures are designed for the secondary capture of fish and they generally must be available for that operation to fulfill their primary purpose, but yet if they are used to contain or secure a fish after the secondary catching operation, they generally are occupied for some substantial period of time and not available for their primary purpose during that time.

The instant invention provides a fish harness which is specifically designed to secure and control a fish after the secondary catching operation, to prevent the flopping and thrashing problems commonly associated with fish catching. The harness provides a flexible cable for attachment about the base of a fish's tail with an adjustably positionable hook carried thereon for attachment in the fish's mouth, such that the positioning of the hook may be adjusted upon the cable to bring the tail of a fish toward its mouth and maintain this positioning until released. This harness action forces a fish's body into an arcuate shape and the arc may be made sufficiently small that the fish is prevented from any further flopping until its expiration. This type of harness device seems not to have been heretofore known for these purposes.

Such harness provides other secondary functions. It provides a means, attached to the fish, that may be used to aid its carriage, either after secondary catching and before expiration or after the expiration of the fish. The device also provides elements that may be used in the secondary catching operation itself, if desired. Either the loop may be used as a traditional "tailer" to fasten about the tail of a fish or the hook may be used as a traditional gaff to be engaged in the fish, in either case to aid in moving the fish from its water environment through the atmosphere and to a support. The device is not particularly designed or adapted for the secondary catching functions, though it does accomplish them if it be appropriately manipulated and controlled.

My harness is of an unusually simple design and formed with relatively few elements so as to make it sufficiently inexpensive that a plurality of such harnesses may be maintained for simultaneous use with several fish. Since a fish normally expires within a relatively short period of time after its removal from its aqueous environment, a harness device may be removed from the fish after its expiration, if desired, to allow fairly immediate reuse.

My harness device is especially useful with larger or more dangerous fish, such as the North Pacific halibut, sharks, barracuda, salmon and the like. The harness is advantageous for use with these fish under most circumstances, but it is especially useful when a fisherman is carried in a smaller boat of the ten to twenty foot variety. A Pacific Coast halibut may weigh more than a hundred pounds and is an extremely strong fish which can break human bones by its thrashing. A shark or barracuda often may not be so large, but both are dangerous because they can effectively bite a human, even out of their aquatic environment.

In the past in dealing with such fish, it has been a common practice to attempt to kill them, either before they come aboard a boat or immediately thereafter. This, however, has not proven too effective. Commonly halibut or sharks may be shot while they are in the water, but it is difficult to kill them with a projectile and almost necessary that a projectile hit their brain to kill them in any short period of time. This provides substantial difficulties for a fisherman because firstly, the fish is rapidly moving so that it is difficult to obtain a proper aim for a projectile, the fish's brain is very small compared to the rest of its body size, and most people, even including fishermen, do not know the anatomical positioning of the fish's brain. Similar problems tend to persist after the fish is brought on board a boat. Commonly it has been attempted to kill fish with bat-like structures of one sort or another or cutting devices, such as an ax or hatchet. Generally again to rapidly kill the fish, its nervous system must be directly traumatized and the same problems as in the case of shooting persists, with additive problems of the potential of damaging fish meat or fish appearance, both of which normally are at least aesthetically important in future dealing with the fish.

My invention, in presenting a solution to these problems, resides not in any one particular feature or structure per se, but rather in the combination of all of its structural elements to synergistically provide the functions necessarily flowing therefrom, as hereinafter more fully specified and claimed.

SUMMARY OF INVENTION

My invention generally provides an elongate flexible cable with an adjustable loop formed in one end and a hook carried thereon by an adjustably positionable fastening structure communicating between the hook and the cable. The cable is passed through a fixed loop defined in its end to form the adjustable loop for fastening about the base of a fish's tail. The hook fastening structure provides an "L" shaped bracket defining a hole in one leg for passage of the cable and carrying the hook in the other leg so that the bracket may maintain pre-determined releasable positioning on the cable by reason of a canting action caused by tensive forces in the cable between its adjustable loop and the hook fastening bracket.

The harness is used by fastening its adjustable loop about the base of a fish's tail, inserting its hook in the fish's mouth and tightening the hook on the cable between the loop and the hook fastening structure, to pull the fish's tail toward its mouth and maintain tension between the two fastened structures.

In creating such a fish harness, it is:

A principal object of my invention to provide a device that prevents a fish from flopping and thrashing about after removal from its aqueous environment.

A further object of my invention to provide such a harness that has an elongate flexible cable with a fastening loop defined in one end and a hook structure carried thereon by adjustably positionable fastening means to maintain hook structure position by reason of tension between the two fastening means.

A further object of my invention to provide such a hook fastening structure that includes an "L" shaped bracket which is releasably positionably maintained on a cable by reason of a canting action to allow ready positioning and release.

A still further object of my invention to provide such a harness that allows use of either of its fastening means for secondary capture of a fish, to aid in removing it from its aqueous environment through the atmosphere and to some solid support.

A still further object of my invention to provide such a harness that may be used as a means for lifting, carrying or transporting a fish after its capture and either before or after its expiration.

A still further object of my invention to provide such a device that is of new and novel design, of rugged and durable nature, of simple and economic manufacture and otherwise well suited to the uses and purposes for which it is intended.

Other and further objections of my invention will appear from the following specification and accompanying drawings which form a part hereof.

In carrying out the objectives of my invention, however, it is to be understood that its essential features are susceptible of change in design and structural arrangement with only preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout:

FIG. 1 is an orthographic view of my fish harness showing its various parts, their configuration and relationship.

FIG. 2 is an partial isometric view of the hook fastening structure showing particularly its interconnection with the harness cable.

FIG. 3 is a somewhat idealized pictorial view of my harness showing its initial placement on a fish.

FIG. 4 is another somewhat idealized pictorial view similar to FIG. 3, except showing the harness in tensed position to prevent flopping motion of the fish.

DESCRIPTION OF THE PREFERRED EMBODIMENT

My invention generally provides cable 10 defining fastening loop 11 in one end and carrying hook fastening structure 13 to interconnect hook 12 to the cable for adjustable motion.

Cable 10 provides an elongate flexible member of a length somewhat greater than the length of a fish to be harnessed. Though the word "cable" is used to describe the member, this is not intended to convey the concept that it must be formed in any particular fashion or of metal, and the member well may be formed of fiber or synthetic cords and the like. The only requirement of this element is that it be somewhat resiliently rigid, flexible and have appropriate size, strength and durability to fulfill its purpose. If the cable be formed of metal, it should be formed of some type of metal that provides appropriate resistivity to corrosion from the aquatic environs in which it commonly will exist, and especially salt water environs. A spiral wound type cable is illustrated, though this particular method of construction is not necessary to my invention and cables formed in other fashions are within the scope of my invention. Ideally, the cable is about one-quarter inch diameter spiral wound multistrand cable of Monel metal or similar material. Normally, the preferred length of the cable is approximately four feet, though this dimension may vary to accommodate particular situations.

One end 14 of the cable 10 may be provided with some type of end fixture 15 to prevent fraying and unraveling of the cable and provide a finished end that is less likely to cause damage to its surroundings then a raw unfinished one. If a fixture or other end finishing is used for the cable and if its external diameter differs significantly from that of the cable 10, such structure must be placed after placement of the bracket of hook fastening structure 13 upon the cable or loop 11 must be subsequently formed to allow the hook fastening structure to be positioned on the cable body. End finishing device 15 can be of any of the common types heretofore known and used for such purposes.

Loop 11 is formed in the second end of cable 14 by bending cable end 16 back upon itself and fastening the cable end to the adjacent cable body by loop fastening device 17. Loop 11 should be relatively small, with a length of about an inch or so, as its only requirement is to slidably carry the cable body therein to form larger adjustable fastening loop 18. Loop fastening device 17, in the instance illustrated, is of a crimpable barrel type and this is the preferred fastener, though other fastening device heretofore known for fastening two adjacent portions of a cable together may be used with my invention.

Both this loop fastening device 17 and end finishing structure 15, if used, should be formed of some material that is reasonably resistant to corrosion and other deterioration that might be caused by the environment in which my invention commonly is used. Most known cable fixtures may be used with my invention and the cable may even have its strands spliced to form its end and loop structures, though in the modern day it is not particularly economically feasible to use traditional hand splicing techniques.

Hook fastening structure 13 provides an "L" shaped bracket having perpendicularly related and structurally joined cable fastening leg 19 and hook fastening leg 20. The cable fastening leg defines in its medial portion cable hole 21 of a diameter slightly larger than the external diameter of a cable to be carried in the hole, so as to allow both slidable motion of the cable through that hole and fastening of the cable therein by means of a canting type positioning of the hole defining surfaces relative to the cable. The cable fastening leg defines in its medial portion hook ring hole 22 sized to receive a hook ring in a movable fit. This fastening bracket 19, 20 is a rigid element and must be of appropriate strength to sustain the forces that a fish might place upon it when in use and yet maintain its configuration. It preferably is formed of some corrosion resistant metal. Bracket dimensioning is not particularly critical, though it need have no extensive size and for ordinary sized cables and hooks, its legs preferably have an areal extent of about one inch in each dimension, the thickness of the bracket is sufficient to provide the strength required of the structure.

Hook ring 23 is a toroidally shaped structure, as illustrated, which interconnects hook 12 with fastening bracket 19, 20. The hook ring, at least at some stage in its formation, must be openable to allow it to interconnect the fastening bracket and hook. This may be conveniently accomplished by use of a split ring as illustrated, or a ring that is interconnected after its placement such as by welding its ends together (not shown). The size and configuration of this hook ring are not critical so long as the ring have strength to fulfill its purpose. The ring preferably is formed of some corrosion resistant metal, preferably in about the configuration illustrated in relation to the other parts of my invention.

Hook 12 provides fastening eye 24 structurally communicating with shank 25 which in turn structurally communicates to hook bend portion 26 and terminates in point 27. Though the hook illustrated is of the short shanked variety with an upturned eye and a barbless point, these features are not essential to my invention and most larger hooks that provide means of interconnecting with a fish's mouth may be used with my harness. A barbless point is generally more convenient than a barbed one as the former is easier to dislodge from a fish's mouth when it be desired to remove it and the barb is not required for use with my harness by reason of the nature of its operation. An ordinary gaff hook or shark hook, commercially obtainable in present day commerce, are quite satisfactory for use in my harness. The only requirement for the hook is that it provide means for releasable attachment to or in a fish's mouth and have appropriate strength and rigidity to maintain its positioning and configuration under the stresses that are placed upon it during use. Commonly for most purposes I prefer a hook formed of rod having a diameter of about five-sixteenths or three-eighths of an inch and with a throat of approximately three inches. The size of eye 24 must be such as to define a hole large enough to movably receive hook ring 23 therethrough. The hook should be formed from normal hook metal heretofore known to provide appropriate rigidity, strength and corrosion resistance.

Having thusly described the structure of my invention, its use may be understood, particularly with reference to FIGS. 3 and 4 of the appended illustrations.

To use my harness, firstly a mechanism is formed according to the foregoing specification and as illustrated especially in FIG. 1 of the drawings. My harness is applied to a fish after that fish has been captured and reduced into possession by primary and secondary catching means as appropriate and required.

To apply the harness, cable end 14 is passed through loop 11 to form larger adjustable fastening loop 18. This fastening loop is placed about the body of fish 28 near the base of its tail, at a point where the body structure has a lesser peripheral dimension than on either side. Fastening loop 18 is then tightened by pulling the cable body through loop 11 to positionally maintain loop 18 while fixing the hook portion of the harness.

Hook 12 is then inserted in the mouth structure of fish 28, normally about its lower jawbone, as illustrated in FIG. 3. The free cable end 14 then is moved to pull the cable through hole 21 in cable fastening bracket 19, 20 to tighten the cable between that bracket and adjustable loop 18. This pulling is continued until the fish's body is forced into a curved shape, as illustrated in FIG. 4, so that the fish's body creates some tension between the fastening loop and hook 12. As this occurs and the cable is tightened between the hook and fastening structure, the fastening bracket will cant relative to the cable body carried in cable hole 21 in its cable fastening leg 19. This action results since the hook carried by that bracket is necessarily fastened to the fish at a spaced distance laterally of the cable so as always to create an angled relationship between the fastening bracket and the cable, no matter what their relative orientation, to cause a canting action that releasably fastens the surface defining the cable hole in the fastening bracket upon the cable.

With the harness in this position and the fish's body bent from its normal linear configuration, there will be a constant tension maintained in the cable between the fastening loop and hook structure so that the canting action of the fastening bracket will positionally maintain the fastened mode of the harness against any further forces created upon it by the fish or otherwise. In this condition, if it be desired, the fish may be carried or transported manually or mechanically by manual grasping or mechanical interconnection with the harness cable between the fastening loop and hook member. Any additional force applied to the cable in the area between its fastened portions will merely enhance its fastening action.

To release the harness when desired, it is merely necessary to manually manipulate the fastening bracket relative to the cable to bring the axis of the cable that passes through cable hole 21 in the fastening bracket into substantial alignment with the axis of that hole, and the bracket may then be moved in a sliding motion along the cable to release tension between its fastening structures sufficiently to allow removal of those two fastening structures from the fish. Normally, the harness will be left in place until the fish expires naturally or is otherwise dispatched by a fisherman so that it will no longer flop.

It is to be noted that by reason of the fastening action of the fastening bracket upon the harness cable, the various parameters involved may regulate the nature of this fastening. The further the distance between either the cable hole or hook ring hole from the interconnection of the two legs of the fastening bracket, the more severe will be the canting of that bracket on the cable to cause a more secure fastening. Similarly the closer the size of cable hole 21 to the external diameter of cable 10 and the sharper the edges of that fastening hole, the more severe will be the fastening action. The nature of the surface of cable 10 and the amount of its resiliency or stiffness will also effect the nature of fastening of the fastening bracket upon it. All of these various parameters may be regulated as desired to produce the degree of fastening appropriate in a particular instance.

It should further be noted that either of the fastening devices of my harness might, if desired, be used to aid in the secondary catching of a fish with the loop structure being used as traditional "tailer" or the hook structure being used as a traditional gaff. Quite conveniently if one fastening structure is used to fasten to the fish, the other might be used by a fisherman to aid manual manipulation. My harness is not particularly adapted for this secondary catching function, however, and probably is not so convenient for such use as the traditional secondary catching structures heretofore known, but my harness may well serve this purpose, especially in the case of an emergency situation.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent and

What I claim is:

1. A harness to restrain a fish comprising, in combination:

an elongate flexible cable having a loop defined in one end thereof;

a rigid "L" shaped hook fastening bracket carried by the flexible cable for slidable motion and adjustable positioning thereon, said hook fastening structure having a fastening arm defining a cable hole with a diameter to allow slidable motion of the cable therein and provide adjustable positioning upon the cable by canting of the bracket relative to the cable and a fastening ring arm movably carrying a fastening ring interconnecting the hook therewith; and a hook carried by the hook fastening structure.

2. A fish harness to prevent flopping motion of a captured fish, comprising, in combination:

an elongate flexible cable having a fixed loop defined in one end and the cable passed through the fixed loop to form an adjustable fastening loop at the first cable end;

a hook fastening structure carried on the cable outside the adjustable loop and including a rigid "L" shaped fastening bracket having a fastening arm defining a cable hole and a hook arm having means to movably interconnect a hook therewith; and a hook interconnected with the hook connecting means of the hook arm of the hook fastening structure.

3. The invention of claim 2 further characterized by the adjustable loop being positioned about the tail of a fish, the hook being positioned in the mouth of said fish and the cable between the hook and the adjustable loop being tightened to create tension in the cable between the adjustable loop and the hook.

* * * * *